United States Patent [19]
van der Grinten

[11] 3,724,175
[45] Apr. 3, 1973

[54] COMPOSITE MEMBRANE USEFUL IN NONINVASIVE SENSOR FOR GASES AND VAPORS

[75] Inventor: Willem J. van der Grinten, Scotia, N.Y.

[73] Assignee: General Electric Company, Schenectady, N.Y.

[22] Filed: Aug. 5, 1971

[21] Appl. No.: 169,170

[52] U.S. Cl. .................................55/158, 264/41
[51] Int. Cl. ....................B01d 53/22, B29d 27/00
[58] Field of Search .....55/16, 158; 210/500; 264/41, 264/49

[56] References Cited

UNITED STATES PATENTS

| | | | |
|---|---|---|---|
| 2,944,017 | 7/1960 | Cotton | 210/500 |
| 3,445,321 | 5/1969 | Groves | 55/158 |
| 2,965,445 | 12/1960 | Goens et al. | 210/500 |
| 3,010,536 | 11/1961 | Plurien et al. | 55/158 |
| 3,335,545 | 8/1967 | Robb et al. | 55/158 |
| 3,649,199 | 3/1972 | Littlejohn | 55/16 |

*Primary Examiner*—Charles N. Hart
*Attorney*—Jerome C. Squillaro et al.

[57] ABSTRACT

A two-phase membrane construction is described comprising a perforated substrate of essentially nonpermeable material, each perforation of which is impregnated with solid polymer material. Means are also provided adjacent the surface of the substrate for equalizing the gas flux over the surface of the polymer-filled perforations. An exemplary two-phase membrane in a membrane/vacuum/mass spectrometer combination is described for use in the non-invasive on-time treatment of gas and vapor partial pressures on the skin (or body membranes) of patients or in body fluids held in vitro.

8 Claims, 2 Drawing Figures

PATENTED APR 3 1973 3,724,175
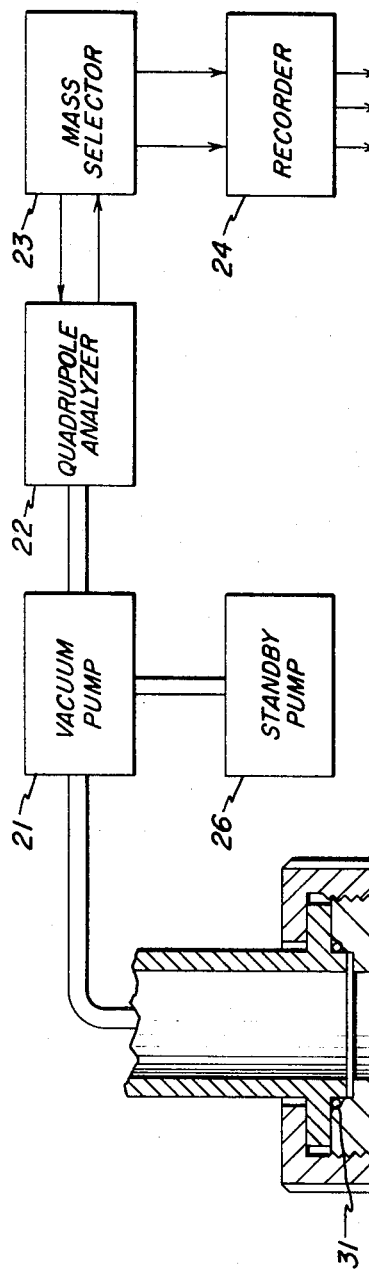
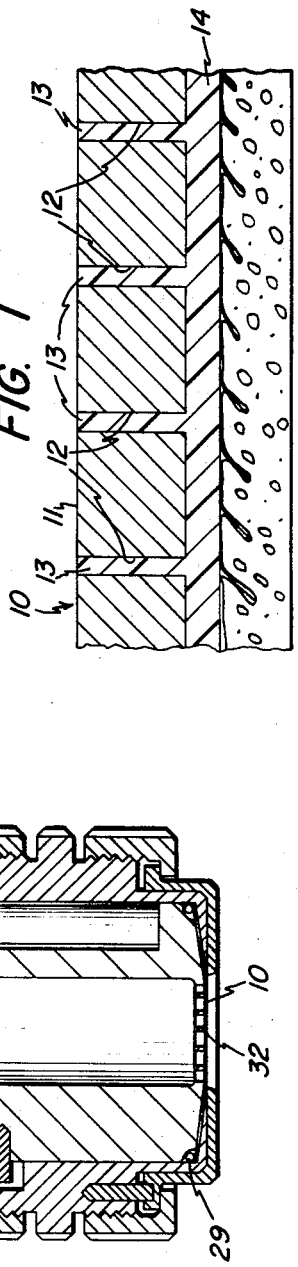
INVENTOR:
Willem van der Grinten
His Attorney

COMPOSITE MEMBRANE USEFUL IN NONINVASIVE SENSOR FOR GASES AND VAPORS

BACKGROUND OF THE INVENTION

Invasive (within the bloodstream) on-time monitoring of gas and vapor pressures (e.g. oxygen partial pressure, carbon dioxide partial pressure, nitrogen partial pressure, etc.) in a patient's blood by the use of single phase permeable membrane/mass spectrometer combinations has been practiced in the past and such equipment is commerically available.

Non-invasive measurements of gas and vapor pressures on the skin made by detecting the passage of gases and vapors therethrough has been achieved. However, the time required for obtaining such readings is considerable.

SUMMARY OF THE INVENTION

A much more rapid readout in making non-invasive measurements of gas and vapor pressures passing through the skin has been achieved using the permeable membrane sensor of this invention in combination with a multi-channel readout mass spectrometer. The permeable membrane employed is a two-phase construction in which discrete quantities of solid polymer membrane material having some preselected value of permeability are made integral parts of a perforated or porous sheet made of an essentially non-permeable phase. These discrete quantities of polymer material extend between major faces of the non-permeable sheet filling the perforations thereof. The resulting combination of materials (a non-porous barrier) is able to satisfactorily attenuate a gas flux with little or no sacrifice in time constant, while possessing the requisites of mechanical strength and low overall permeability.

The preferred construction comprises a regularly perforated substrate of essentially non-permeable material having a low transmission and having each perforation thereof filled with polymer material.

BRIEF DESCRIPTION OF THE DRAWING

The exact nature of this invention as well as objects and advantages thereof will be readily apparent from consideration of the following specification relating to the annexed drawing in which:

FIG. 1 is a section through a preferred construction for the two-phase membrane of this invention shown in contact with the skin for the sensing of gas flux therethrough and FIG. 2 is a schematic representation of equipment actually employed for the non-invasive on-time monitoring of gas and vapor tensions utilizing the membrane construction of this invention.

DESCRIPTION OF THE PREFERRED EMBODIMENT

If a permeable membrane sensor is to be used for non-invasive gas measurements the transport of gases and vapors from tissue layers in contact with the membrane through to the opposite face thereof (the face exposed to a vacuum) must be greatly reduced so as not to disturb the delicate steady state conditions required for accurate measurement.

It is known that attenuation of gas flux through a membrane may be achieved either by selecting a membrane material of low gas permeability and/or by increasing the thickness of the membrane. However, in applying the alternatives to a non-invasive membrane sensor, in each case an intolerably long time delay is encountered in order to secure steady state conditions on the vacuum side of the membrane.

In the following specification and claims the term "gas" is intended to include both gases and vapors and the use of the term "non-permeable" in describing a material means that at standard temperatures and pressure the material has no permeability or such low permeability as to be considered essentially non-permeable.

In theory, a two-phase membrane, per se, may be prepared by employing very small crystals of a non-permeable material as a filler in an amorphous polymer material of a preselected permeability. Unfortunately, as the non-permeable content is increased to approximately 80 to 90 percent by volume (as is required in the practice of this invention) the path length for the transport of dissolved gas across the membrane becomes substantially increased due to the tortuosity of the distribution of the remaining polymer material and this leads in turn to much longer time constants, the membrane loses its flexibility, and pin hole type leaks are very likely to occur.

Thus, because of the inherent problems of quality control in the aforementioned construction, in the two-phase membrane of this invention a perforated film of a non-permeable material is employed as a matrix and the attenuation of the gas flux is accomplished by filling the perforations of the matrix membrane with a solid polymer material having a preselected permeability creating, in essence, a series of more direct paths of preselected permeability through a non-permeable barrier. The advantage of this construction is that the permeable material becomes an integral part of the non-permeable phase yielding a composite structure having some workable preselected time constant and, at the same time, having the mechanical strength required for the particular application.

The relationship between the matrix material and the polymer material should be such that the polymer material is at least about 100 times as permeable to non-interacting gases as the matrix non-permeable material at standard temperature and pressure. A "non-interacting gas" is one that will not swell or react with the membrane materials.

In the construction shown in FIG. 1 of the preferred embodiment of the two-phase membrane construction 10 of this invention, a substrate membrane 11 of a non-permeable material preferably having regularly spaced small perforations 12 therethrough, is shown with these perforations filled with plugs of solid permeable non-porous material 13.

In addition to achieving some desired gas flux attenuation, in the sensing of gas and vapor tensions at the skin (or other body membrane) care must be taken to achieve equalization of undesirable concentration gradients over the surface in contact with the composite membranes prior to passage of the gases through non-porous plugs 13. In FIG. 1, the path of gases being permeated through plugs 13 must first traverse the thin polymer layer 14 conveniently formed integral with plugs 13. The function of layer 14 is to assure a reasonably homogeneous gas flux at the skin membrane interface. Since layer 14 is in direct air-excluding contact with matrix 11, the plugs 13 receive permeating gases directly from layer 14.

In the absence of layer 14 the apparent permeability of a two-phase membrane is a function of:

a. the true permeability (Pr) of the material filling the perforations 12;
b. the transmission (Tr) of the perforated non-permeable substrate 11 (percent of open area), and
c. the thickness ($d$) of the substrate 11.

In the design of a two-phase membrane for sensor applications, it is necessary to minimize the apparent permeability without sacrifice of response time.

Permeability (Pr) is the product of the diffusion coefficient (D) and the solubility (S) of the gas in the material filling holes 12. Since both items a and c affect the response time, the choice of these parameters is limited. On the other hand, because the response time is independent of the transmission (item b), the transmission can be balanced against D.

For a membrane 11 having a thickness of $30 \times 10^{-4}$ cm, a workable perforation diameter would be about $3 \times 10^{-4}$ cm, which provides a cross-sectional area for each perforation of about $7 \times 10^{-8}$ cm$^2$. Non-circular perforations providing comparable cross-sectional area per perforation may, of course, be used.

Transmissions in the range of from about 0.1 percent to about 10 percent are feasible with perforations having a cross-section of the aforementioned magnitude ($7 \times 10^{-8}$ cm$^2$), the particular percent being the function of the number of perforations employed per unit area. For example, perforated nickel substrates have been employed having a thickness of 0.0015 inches perforated with square holes measuring $7.5 \times 10^{-4}$ cm on each side ($56 \times 10^{-8}$ cm$^2$ in cross-sectional area per hole) and with the holes aligned in two directions to a density of 500 lines of holes per linear inch (Tr of about 2 percent).

This perforated metal substrate was impregnated with polymer membrane material by hot pressing a 0.001 inch thick low density polyethylene foil against the perforated metal until polyethylene was extruded into and filled the perforations thereby producing the construction of FIG. 1.

Recommended temperatures for good adhesion of various polymer materials to metals can be found in "Modern Plastics Encyclopedia" (1968 volume). Hot pressing was performed at 120°C under a pressure of 1,000 psi for 15 minutes. Microscopic examination revealed good penetration and adhesion and helium leak detection tests did not reveal any pin holes. The thickness of layer 14 was measured in a number of cases and was found to be in the range of from 0.0003 to 0.0006 inch. Polymer layers 14 may range in thickness from a finite value to about three times the spacing between holes 12.

Metallic perforated substrates of the type employed in the practice of this invention are available commercially in nickel, silver and copper. Although, the particular description employed herein refers to the use of a regular spacing of holes, random distribution of holes over the surface area may also be employed. Layer 14 may or may not be utilized in combination with the two-phase membranes depending upon the use to which the composite membrane will be put.

Since the substrate material (membrane 11) preferably should have no permeability at all, crystalline materials such as metal foils and mica are preferred, however, some amorphous materials such as glass exhibit exceedingly low gas permeabilities at room temperature.

Various polymer materials may be used for plugs 13, for example, silicone rubber, polycarbonate, polyoxylylene oxide. Other polymer materials may be selected using information provided in the literature, e.g. "Gas Permeability of Plastics" by Major et al., July 1962 issue of Modern Plastics, page 135 et seq.

Two-phase membranes of the construction illustrated in FIG. 1 made by the method described hereinabove have been employed as attenuating elements in the non-invasive on-time monitoring of gas tensions at the skin of many parts of the body. This could be extended to include the testing of blood in vitro. The equipment schematically represented in FIG. 2 illustrates the basic components employed for this monitoring operation.

As is shown in FIG. 2, the two-phase attenuating membrane 10 is mounted in sensing head, or sensor housing, 20 the interior of which is in flow communication with high vacuum equipment 21 used for maintaining a pressure in the $10^{-6}$ to $10^{-8}$ torr range in housing 20 and in the multichannel readout mass spectrometer comprising quadrupole analyzer 22, mass selector 23 and recorder 24. The pump for the vacuum system may be a conventional mercury diffusion pump in combination with rotating forepump 26. A getter ion pump may be used in which case the need for a liquid nitrogen trap and the requisite steady supply of liquid nitrogen and cooling water may be eliminated.

A suitable multichannel mass spectrometer is described in application Ser. No. 859,866 — van der Grinten et al. filed Sept. 22, 1969 (now U.S. Pat. No. 3,641,340) and assigned to the assignee of the instant invention. The van der Grinten et al. application is incorporated by reference.

The sensor head 20 should be maintained at some constant temperature during the monitoring. Thus, sensor housing 20 is equipped with thermostatically controlled heater 27 to maintain the temperature of the housing 20 at some preselected value (e.g. 37°C). Membrane 10 has polymer-filled holes only in the central portion thereof over an area smaller than the area of the flow passage 28. The balance of this element is non-porous to prevent the slow by-passing of permeating gases through any permeable plugs 13 that would be out of register with passage 28. Such slow by-pass of gases and/or vapors would greatly increase the waiting period necessary for the attainment of steady state conditions. Preferably, the O-rings 29, 31 are made of gold plated with indium metal. Support for the membrane 10 is provided by ribs 32.

The number of recording channels employed will depend, of course, upon the number of gases and vapors being monitored simultaneously.

The oxygen flux through the two-phase membrane 10 as measured with the equipment described hereinabove at various temperatures has been found to be very small compared to the cutaneous respiration rates of the skin available from the literature. This comparison has confirmed the capability of the composite membrane of this invention for attenuating the transport of gases and vapors to the monitoring system from the tissue layers in contact with the membrane sensor. Thus, the two-phase permselective membrane construction of the instant invention provides a gas flow impedance substantially higher than the equivalent value for the human skin. This condition applies not only for oxygen and carbon dioxide but also for nitrogen.

As a further application, the composite membrane of this invention may be used as the diffusion barrier in an electrochemical system, such as a polarographic oxygen sensor.

What I claim as new and desire to secure by Letters Patent of the United States is:

1. A composite non-porous membrane comprising in combination a matrix layer made of a first solid, one-piece essentially non-permeable material, said layer having a plurality of discrete filled passageways extending therethrough interconnecting the major surfaces thereof, non-porous deposits of a second material completely filling said passageways to form substantially smooth upper and lower major surfaces, said second material being solid and being at least about 100 times as permeable to non-interacting gases as said first material at standard temperature and pressure, said second material being present in the composite membrane in less than about 20 percent by volume.

2. The composite membrane of claim 1, wherein the second material is a polymer material.

3. The composite membrane of claim 1, wherein the first material is metallic.

4. The composite membrane of claim 3, wherein the first material is nickel and the second material is polyethylene.

5. The composite membrane of claim 1, wherein the first material is mica.

6. The composite membrane of claim 1, wherein the first material is glass.

7. The composite membrane of claim 1, wherein one entire face of the matrix layer is covered with a thinner non-porous layer of polymer material in direct air-excluding contact therewith.

8. The composite membrane of claim 7, wherein the second material is polymer material and the thinner layer of polymer material is formed integral therewith.

* * * * *